(12) United States Patent
Syed et al.

(10) Patent No.: US 10,865,987 B2
(45) Date of Patent: Dec. 15, 2020

(54) SEQUENTIAL COMBUSTOR AND METHOD FOR OPERATING THE SAME

(71) Applicant: ANSALDO ENERGIA SWITZERLAND AG, Baden (CH)

(72) Inventors: Khawar Syed, Oberrohrdorf (CH); Madhavan Narasimhan Poyyapakkam, Rotkreuz (CH); Franklin Marie Genin, Baden (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 219 days.

(21) Appl. No.: 15/205,747

(22) Filed: Jul. 8, 2016

(65) Prior Publication Data
US 2017/0009651 A1   Jan. 12, 2017

(30) Foreign Application Priority Data

Jul. 10, 2015 (EP) ..................... 15176259

(51) Int. Cl.
*F23R 3/18*    (2006.01)
*F23R 3/34*    (2006.01)
(Continued)

(52) U.S. Cl.
CPC ................. *F23R 3/18* (2013.01); *F23R 3/12* (2013.01); *F23R 3/20* (2013.01); *F23R 3/346* (2013.01);
(Continued)

(58) Field of Classification Search
CPC .... F23R 3/002; F23R 3/02; F23R 3/04; F23R 3/16; F23R 3/18; F23R 3/12; F23R 3/20;
(Continued)

(56) References Cited

U.S. PATENT DOCUMENTS 6,263,660 B1 * 7/2001 Lawlor ................ F23G 5/46
60/776
8,402,768 B2 * 3/2013 Syed ................... F23R 3/12
60/791

(Continued)

FOREIGN PATENT DOCUMENTS

EP   2 522 912 A1   11/2012
EP   2 725 301 A1   4/2014
(Continued)

OTHER PUBLICATIONS

Chandavari et al., Diffuser Angle Control to Avoid Flow Separation, Sep.-Oct. 2014, International Journal of Technical Research and Applications, vol. 2 Issue 5, pp. 16-21.*
(Continued)

*Primary Examiner* — Gerald L Sung
*Assistant Examiner* — Stephanie Cheng
(74) *Attorney, Agent, or Firm* — Buchanan Ingersoll & Rooney PC

(57) ABSTRACT

The present invention generally relates to a sequential combustor for a gas turbine having second and/or subsequent stages of a re-heat, sequential or axially-staged combustion system. A variation in Mach number along the flow path can be used to control static temperature variation, which in turn influences the progress of auto-ignition reactions that eventually lead to the onset of combustion.

12 Claims, 19 Drawing Sheets

(51) Int. Cl.
*F23R 3/20* (2006.01)
*F23R 3/50* (2006.01)
*F23R 3/12* (2006.01)
*F02C 3/14* (2006.01)

(52) U.S. Cl.
CPC ............ *F02C 3/14* (2013.01); *F05D 2240/35* (2013.01); *F23R 3/50* (2013.01); *F23R 2900/03341* (2013.01)

(58) Field of Classification Search
CPC .. F23R 3/286; F23R 3/34; F23R 3/346; F23R 2900/03341; F02C 3/14; F05D 2240/121; F01D 1/04
See application file for complete search history.

(56) References Cited

U.S. PATENT DOCUMENTS

| | | | | |
|---|---|---|---|---|
| 8,713,943 | B2* | 5/2014 | Poyyapakkam | F23C 5/08 60/737 |
| 8,763,400 | B2* | 7/2014 | Bunker | F23D 14/64 60/739 |
| 9,657,576 | B2* | 5/2017 | Ramm | F01D 5/145 |
| 10,294,796 | B2* | 5/2019 | Li | F01D 5/143 |
| 2003/0037533 | A1* | 2/2003 | Carelli | F02C 3/16 60/39.17 |
| 2008/0078182 | A1* | 4/2008 | Evulet | F02C 3/14 60/776 |
| 2012/0285172 | A1* | 11/2012 | Poyyapakkam | F23R 3/14 60/737 |
| 2012/0297777 | A1 | 11/2012 | Poyyapakkam et al. | |
| 2012/0297787 | A1 | 11/2012 | Poyyapakkam et al. | |
| 2014/0109588 | A1 | 4/2014 | Ciani et al. | |
| 2014/0123665 | A1* | 5/2014 | Wood | F23R 3/346 60/774 |
| 2016/0146468 | A1* | 5/2016 | Gao | F23R 3/283 60/742 |
| 2017/0089584 | A1* | 3/2017 | Poyyapakkam | F23R 3/286 |

FOREIGN PATENT DOCUMENTS

| | | |
|---|---|---|
| EP | 2 725 302 A1 | 4/2014 |
| WO | WO 2011/054757 A2 | 5/2011 |
| WO | WO 2011/054771 A2 | 5/2011 |

OTHER PUBLICATIONS

Barry Azzopardi, Enlargement, Flow and Pressure Change, Jun. 2013, Thermopedia, retrieved Jun. 19, 2018 from http://www.thermopedia.com/content/730/.*

NASA, Shape Effects on Lift, Jan. 2011, Glenn Research Center, retrieved from NASA website on Apr. 11, 2019 at https://www.grc.nasa.gov/www/k-12/airplane/shape.html (Year: 2011).*

Search Report dated Dec. 23, 2015, by the European Patent Office for Application No. 15176259.8.

Office Action (Communication) dated Aug. 3, 2018, by the European Patent Office in corresponding European Patent Application No. 15176259.8. (9 pages).

* cited by examiner

SEQUENTIAL COMBUSTOR AND METHOD FOR OPERATING THE SAME

TECHNICAL FIELD

The present invention generally relates to a sequential combustor for a gas turbine. The invention additionally refers to a method for operating the same.

BACKGROUND

With reference to FIG. 1, it is depicted a scheme of a sequential combustor according to the known art. The combustor comprises two distinct zones: the burner, or a pre-mixing section (where the fuel and oxidant are premixed), and a combustor chamber where the combustion takes place. The inlet oxidant entering into the combustor is relatively hot, in some cases ca. 1250K-1300K. At these temperatures, the fuel injected into the burner auto-ignites. In order to achieve low emissions it is important that the fuel and the oxidant are very well premixed prior to combustion. The auto-ignition delay time determines the time allowable for premixing.

FIG. 2 shows the auto-ignition delay time for natural gas as a function of temperature.

At the temperature of 1250K-1300K, the auto-ignition delay time is approximately 1-2 msec for a typical natural gas. It is the latter that limits the allowable inlet temperature. A mixing time of 1-2 msec is the capability of present state-of-the-art systems, when operated at a reasonable pressure drop, for which there is a limit, due to the engine performance and to combustor system management concerns.

It is to be noted, that if the inlet temperature is increased, the CO turndown characteristics of the gas turbine are improved, as indicated in FIG. 3.

It would therefore be advantageous, if the inlet temperature were increased without resulting in an increased pressure drop.

Downstream of the burner is a sudden expansion into the combustor chamber. Such state-of-the-art geometry results in recirculation zones, the purpose of which is to provide flame stabilization. Theoretically, as the combustion occurs through auto-ignition, there would be no need for flame stabilization. However, practically, the inlet boundary conditions fluctuate and vary, such that relatively large fluctuations in auto-ignition delay time may occur. Without some means of flame stabilization, it would be not possible to keep the flame within the desired location. The recirculation zones, necessary to stabilize the flame, however, are very dissipative. Therefore, in order to limit pressure losses, the velocities have to be kept relatively low, corresponding to a Mach number in the order of 0.1, prior to combustion. As well known, the Mach number is defined as the velocity of the flow of gas divided by the value of the local speed of sound. Additionally, the combustion process is then controlled by fluid dynamic transport, within the recirculation zones and the shear layers surrounding them. In state-of-the-art systems, these timescales are of the order of milliseconds, even though the chemical processes are more than an order of magnitude smaller (CO oxidation is of the order 0.1 m sec and the heat release chemical kinetics is of the order 0.01 m sec).

It is to be noted that if the flow velocity were greater, the combustor cross section could be smaller. This would allow for a more compact combustor and easier integration of the combustion process into a nozzle guide vane. Additionally, if the combustion process were not stabilized by fluid dynamic structures, such as recirculation zones, and therefore rate limited by fluid dynamic processes, the combustor residence time could be significantly shorter. This would allow yet greater compactness of the combustor, yielding benefits for cost and system management, but also allowing a reduction in NOx emissions, particularly at very high firing temperatures.

Re-heat (or after burner) systems for aero-engine applications broadly work on the same principles described above. Fuel is injected into the exhaust from the turbine. The combustion, which is typically initiated through auto-ignition, is stabilized by recirculation zones, which are typically induced by V gutters. The length of the exhaust duct has to be long enough for the flame to propagate from these recirculation zones, across the entire width of then duct. Combustion is therefore rate limited by fluid dynamic processes.

It is to be noted that if the combustion would be allowed to progress at chemical kinetic timescales, the exhaust duct could be shorted, allowing a saving in weight.

SUMMARY OF THE INVENTION

It is an object of the present invention to solve the aforementioned technical problems by providing a sequential combustor as substantially defined according to independent claim 1.

Moreover, a further object of the present invention is to provide a method for operating a sequential combustor as defined in dependent claim 14.

According to various aspects of the invention, it is disclosed a new sequential combustor and a novel method for operating the same by controlling auto-ignition reactions and stabilizing the subsequent heat release reactions. Specifically, the invention concerns the 2nd and/or subsequent stages of a re-heat, sequential or axially-staged combustion system. According to the invention, variation in Mach number along the flow path is used to control static temperature variation, which in turn influences the progress of auto-ignition reactions that eventually lead to the onset of combustion.

There are two distinct ideas to be pursued where the variation of static temperature is utilised. These can be applied either together, to exploit the advantages of both, or the first idea can be applied on its own.

According to an aspect of the invention, the flow of fuel and oxidant within the premixing section is accelerated, such that the static temperature drops, thereby slowing down the auto-ignition reactions. As a consequence, CO turndown can advantageously be extended, and that the downstream combustor can be made more compact.

According to preferred embodiments of the invention, after the high velocity premixing section the flow is accelerated still further, and then it is decelerated along a well-controlled, aerodynamically designed path. The resulting gradient in static temperature is then utilised to stabilize/anchor the auto-ignition flame. This replaces known methodologies that utilise recirculation zones. Advantageously, this allows the combustion to occur at a higher Mach number, for a given pressure loss, enabling the system to be more compact (i.e. having a smaller cross section) which gives advantage for cooling flow demand and component life. Another benefit is that combustion can be completed within a shorter residence time. This results in lower NOx emissions, particularly at high firing temperatures. The positive static temperature gradients in the region where the flame is located make that reheat flame more stable with respect to perturbations that can lead to heat release fluctuations. The sequential combustor is therefore more robust against thermo acoustic oscillations. A smaller combustor volume and cross section also enable an easier integration of the combustor into the nozzle guide vanes. This allows the removal of a leakage plane, as well as reduction in cost and weight.

A sequential combustor according to the invention may be placed downstream of a first combustor, but upstream of the turbine stages, as in the case of sequential combustor within a constant pressure sequential combustion (CPSC) system, as shown in FIG. 4.

Alternatively, it may be placed in between turbine stages. However as in the case of standard sequential combustors, a number of sequential combustors, utilising the present invention, can be placed between several turbine stages, as shown in FIG. 5.

Alternatively, a sequential combustor according to the invention may be placed at the exit of the turbine stages, in the exhaust duct for reheating (afterburning) applications, as used in some aero-engine system. See scheme depicted in FIG. 6.

According to an aspect of the invention, it is provided a sequential combustor for a gas turbine, comprising a premixing section and a combustion chamber arranged downstream of the premixing section, the premixing section being configured to receive and premix a flow of oxidant and fuel, wherein the premixing section is arranged along a converging duct having one or more convergent passages.

According to a preferred aspect of the invention, the premixing section comprises a a diverging duct, arranged downstream the converging duct and each convergent passage.

According to a preferred aspect of the invention, the convergent passages are formed between a plurality of vanes.

According to a preferred aspect of the invention, each vane comprises a rounded leading edge.

According to a preferred aspect of the invention, the rounded leading edge has a radius of curvature which is a fourth or less of a distance D between two adjacent vanes.

According to a preferred aspect of the invention, each vane has a converging side wall having an angle a of passage contraction substantially equal to or less than 30°, along the passage.

According to a preferred aspect of the invention, the passage contraction angle a is substantially equal to 20°.

According to a preferred aspect of the invention, the premixing section comprises mixing devices distributed along facing sidewalls of adjacent vanes.

According to a preferred aspect of the invention, the premixing section comprises fuel injectors.

According to a preferred aspect of the invention, the premixing section comprises an airfoil element positioned along a first portion of the converging duct between adjacent vanes, wherein the airfoil element has a rounded leading edge and a trailing edge, and wherein the fuel injectors are provided at the proximity of the trailing edge.

According to a preferred aspect of the invention, the combustor chamber comprises a diffuser section comprising one or more divergent passages.

According to a preferred aspect of the invention, the divergent passages formed between the plurality of vanes and wherein each divergent passage is arranged downstream of a convergent passage, the convergent and divergent passages being formed by a common vane-shaped passage.

According to a preferred aspect of the invention, the diffuser section has an expansion vane angle β equal to 9° or greater.

According to a preferred aspect of the invention, expansion vane angle β is substantially equal to 15°.

According to a further aspect of the invention, it is also provided a method for operating a sequential combustor for a gas turbine, the sequential combustor comprising a premixing section and a combustion chamber arranged downstream of the premixing section, the premixing section being configured to receive and premix a flow of oxidant and fuel and arranged along one or more convergent passages, wherein the flow of oxidant and fuel is admitted within said one or more convergent passages and therein accelerated to a velocity correspondent to a Mach number substantially equal to 0.5 or greater.

According to a preferred aspect of the invention, the combustion chamber comprises a diffuser section comprising one or more divergent passages formed between a plurality of vanes and wherein each divergent passage is arranged downstream a convergent passage, the convergent and divergent passages being formed by a common vane-shaped passage, wherein the flow of oxidant and fuel is decelerated along the one or more divergent passages and reaches a velocity correspondent to a Mach number in the region of 0.3 prior to combustion.

BRIEF DESCRIPTION OF THE DRAWINGS

The objects, advantages and other features of the present invention will become more apparent upon reading of the following non-restrictive description of preferred embodiments thereof, given for the purpose of exemplification only, with reference to the accompany drawing, through which similar reference numerals may be used to refer to similar elements, and in which.

Preferred and non-limiting embodiments will be now described in detail with reference to the above referenced drawings.

DETAILED DESCRIPTION OF THE INVENTION

Figure 7:
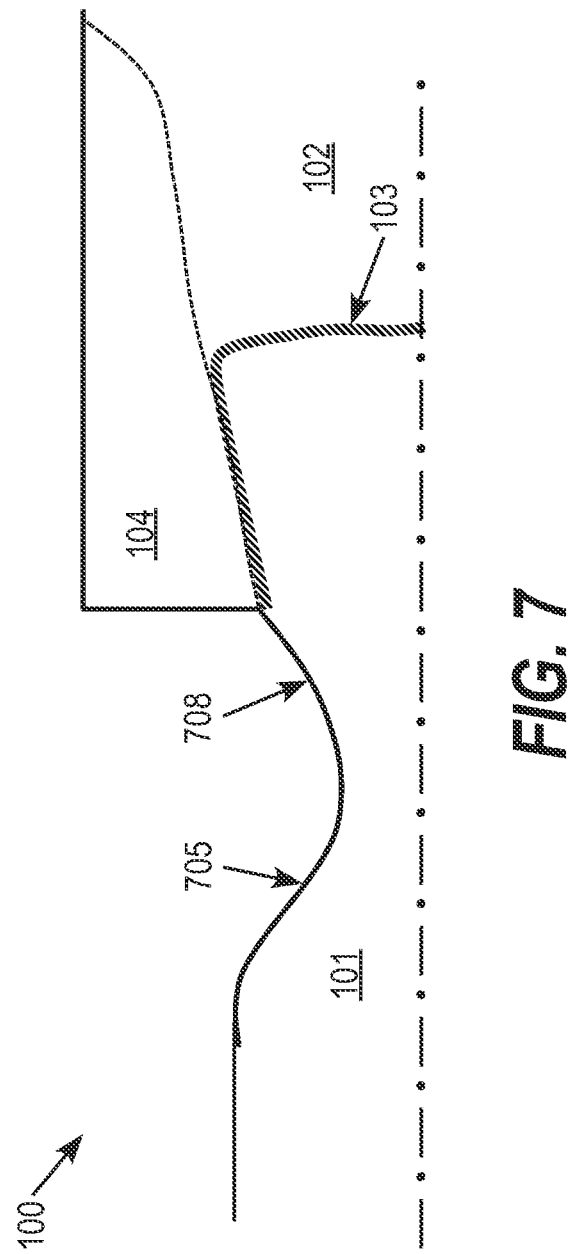
FIGS. 7-9 show respectively a schematic, a top and a perspective view of a sequential combustor according to a first exemplary embodiment of the present invention.

With reference to FIG. 7, it is shown a schematic side section view of a sequential combustor 100 according to a first embodiment of the invention.

In particular, the sequential combustor 100 comprises a premixing section, or burner, 101, configured to receive and premix a flow of oxidant and fuel, and a combustion chamber 102 arranged downstream the premixing section 101.

As indicated in the figure, the premixing section is arranged along a convergent duct 705.

In this case, the combustion chamber 102 is of a conventional type, and the flow of oxidant and fuel, after the burner experiences a first diffuser section 708 and then a sudden expansion into a chamber 102. In combustion chamber 102 recirculation zones 104 are generated which help stabilizing a flame indicated in the drawing with numeral reference 103

Figure 8:
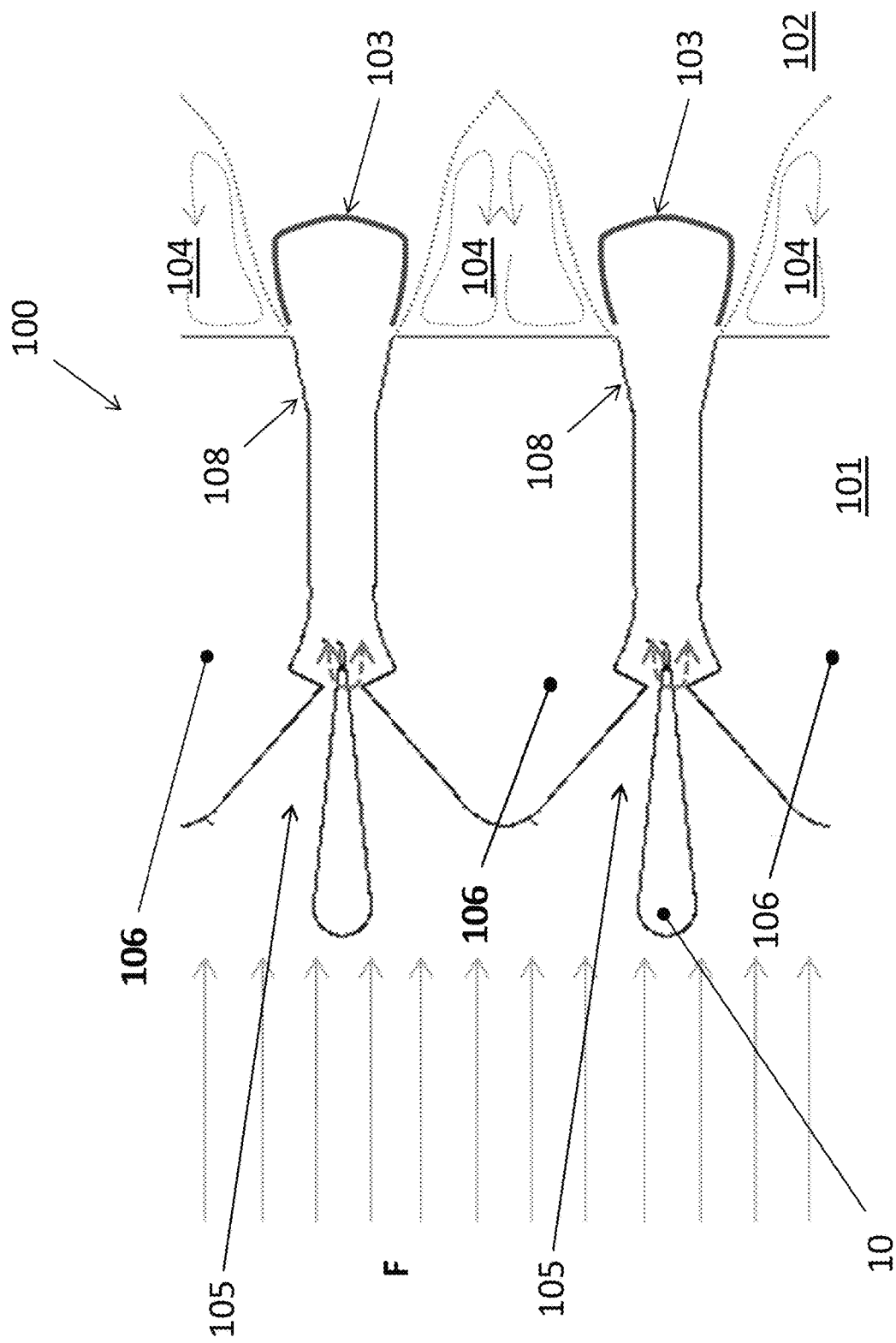
Figure 9:
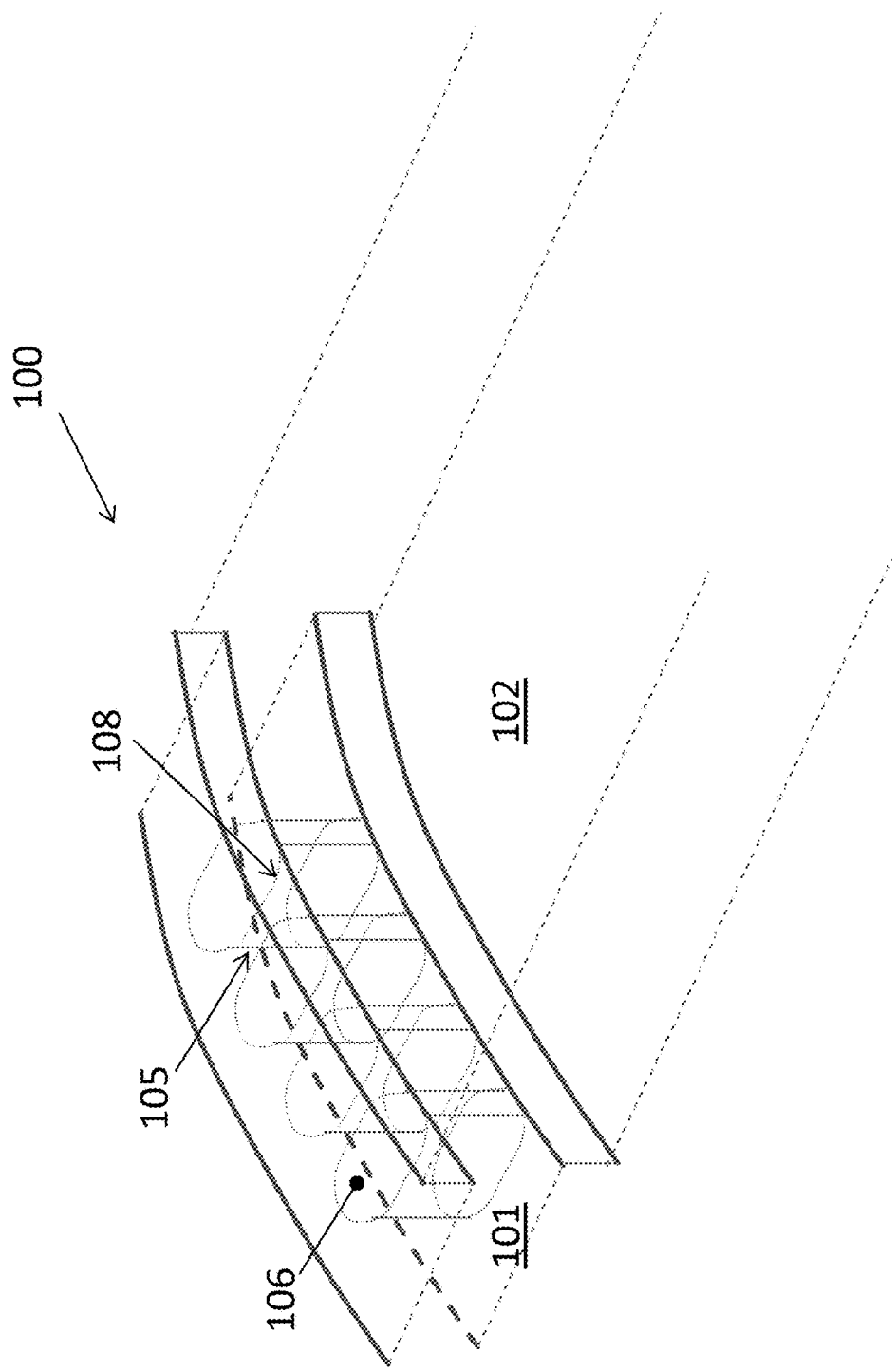

With reference to following FIGS. 8 and 9, it is shown the sequential combustor 100 respectively in side section and perspective views, where the flow of oxidant (coming from a first upstream combustor, not shown) is indicated with arrows F. Sequential combustor 100 may comprise a plurality of convergent passages 105, into which oxidant and fuel enters, which are passages 105 formed between a series of vanes 106. Downstream the premixing section is the combustion chamber 102, common for all the passages 105, including recirculation zones 104 which help stabilizing flames 103.

Figure 10:
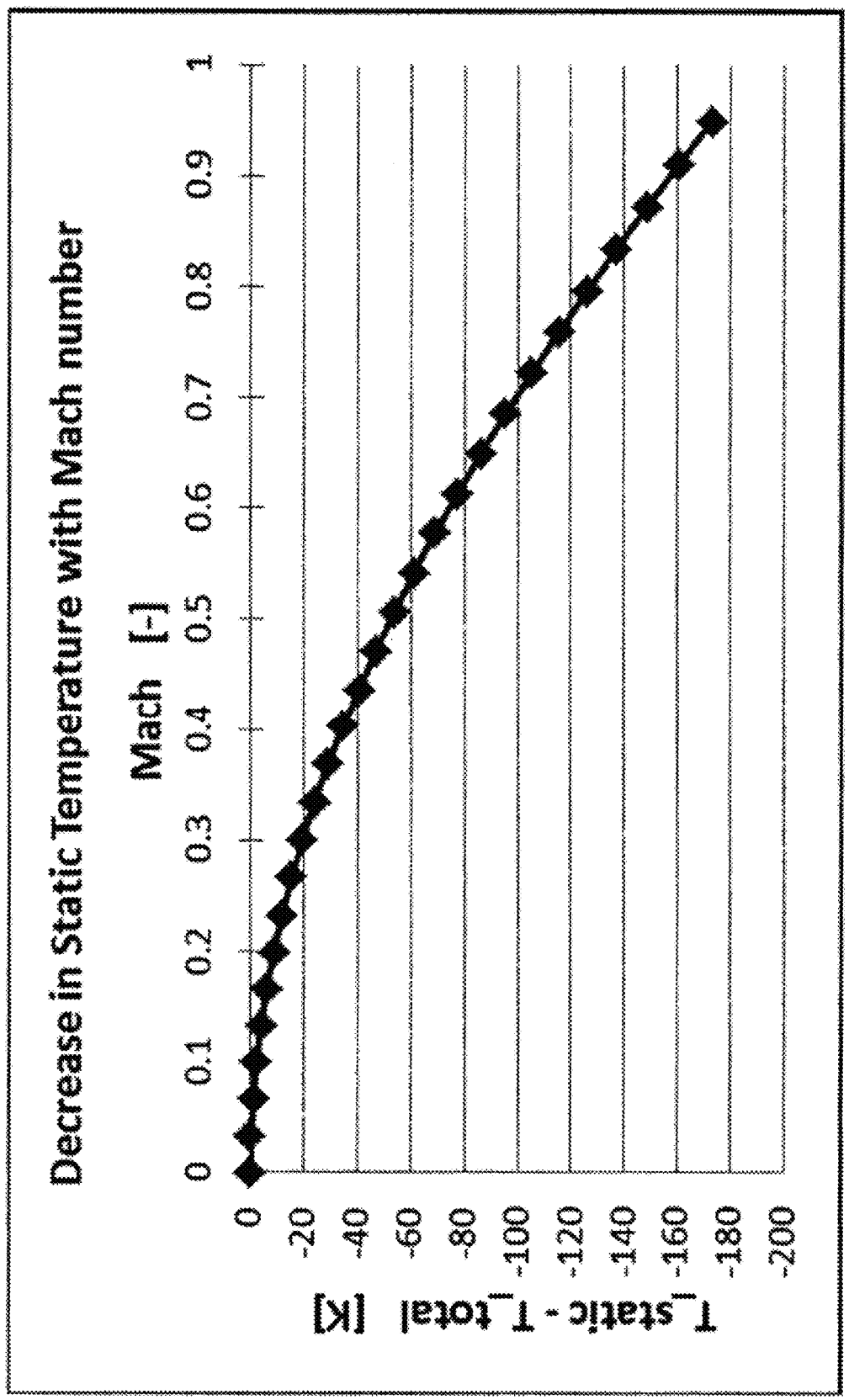
FIG. 10 depicts a graph showing the decrease of static temperature as a function of the Mach number.

Advantageously, the flow of oxidant and fuel in the premixing section 101 is accelerated to a velocity corresponding to a Mach number which has a value of approximately 0.5 or greater. This causes the static temperature to decrease, as shown by the graph in following FIG. 10.

Figure 1:
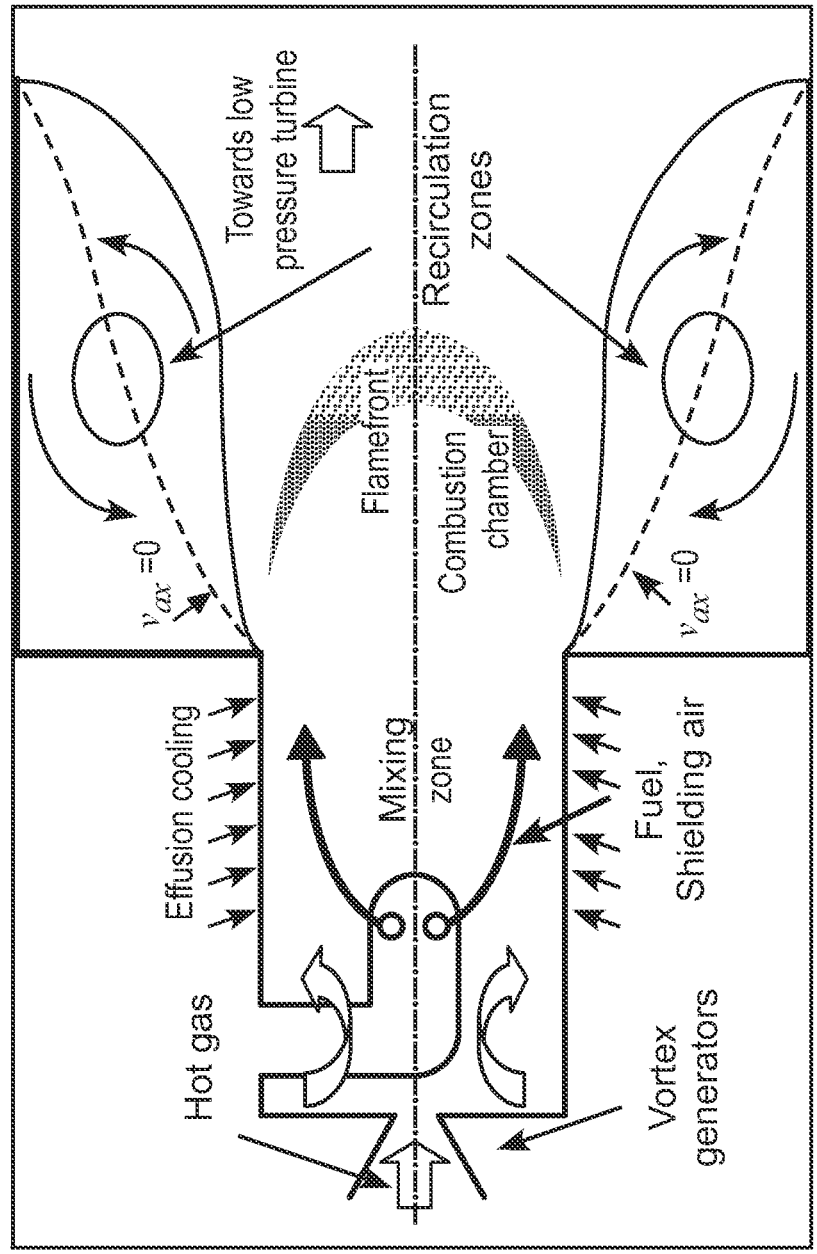
FIG. 1 shows an arrangement of a combustor according to the known art.
Figure 2:
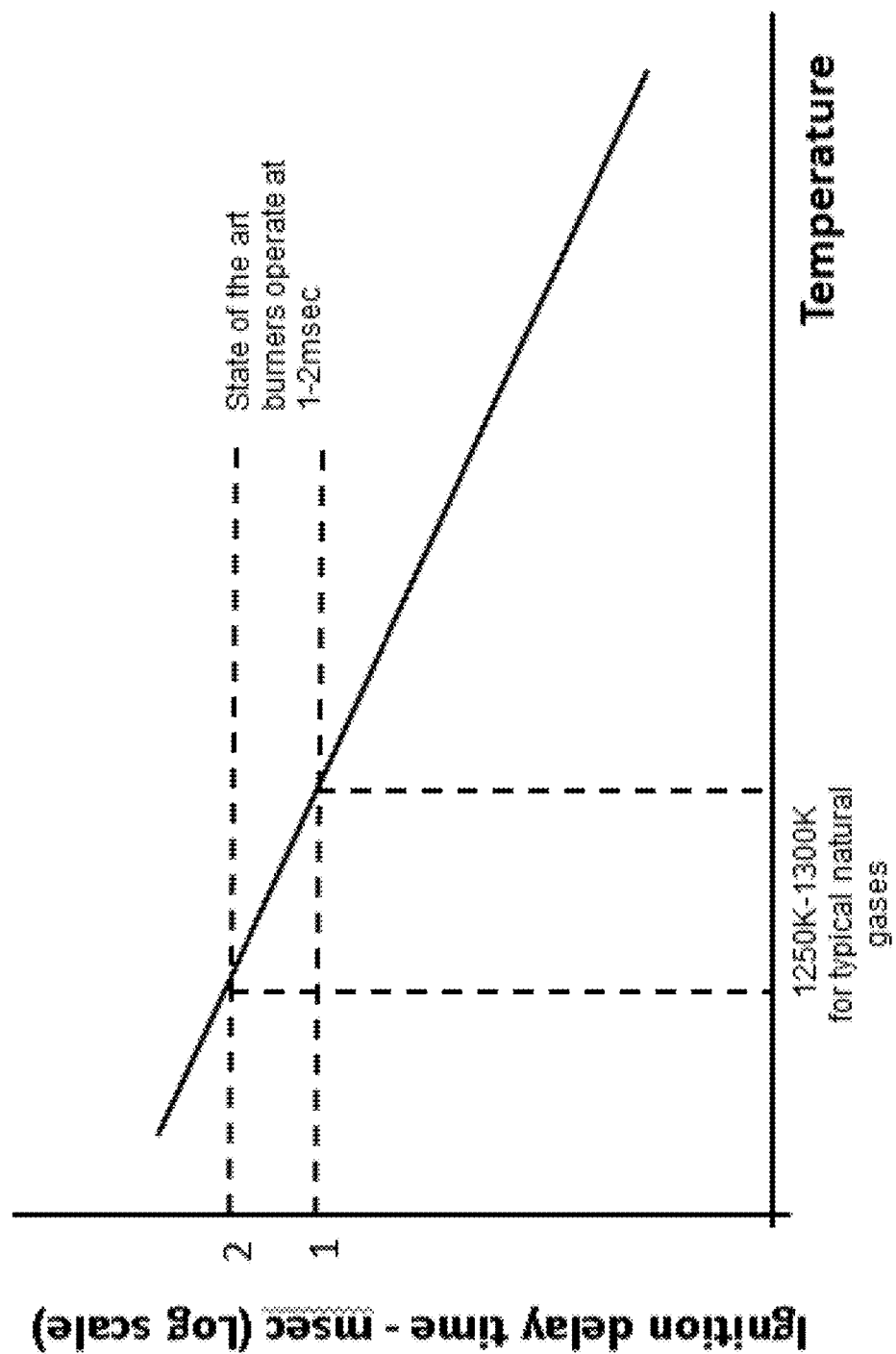
FIG. 2 is a graph showing the auto-ignition delay time for a natural gas as a function of temperature.
Figure 3:
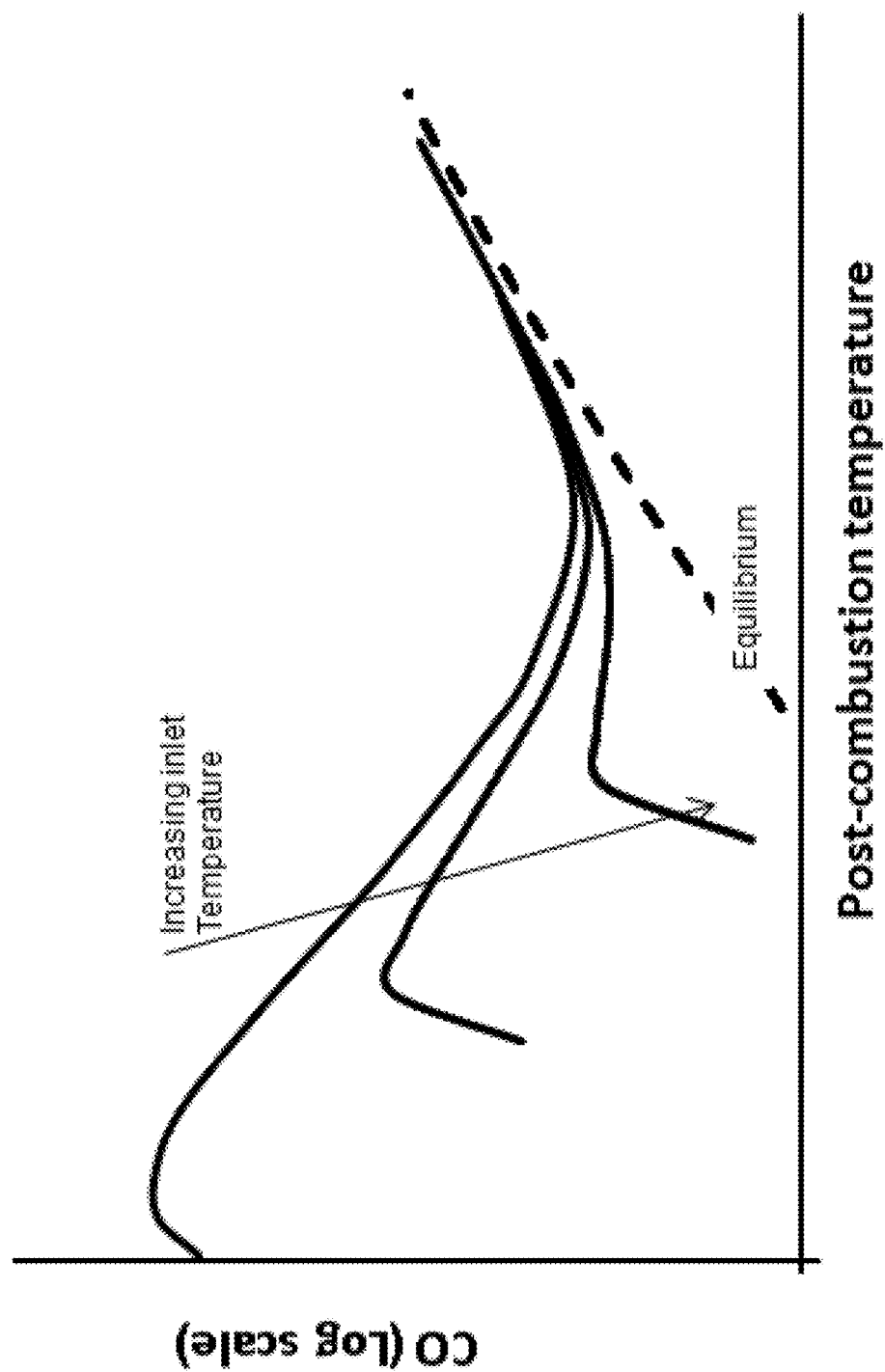
FIG. 3 is a graph showing the CO emissions as a function of a post-combustion gas temperature from a sequential combustor, and the impact of burner inlet temperature is indicated.
Figure 4:
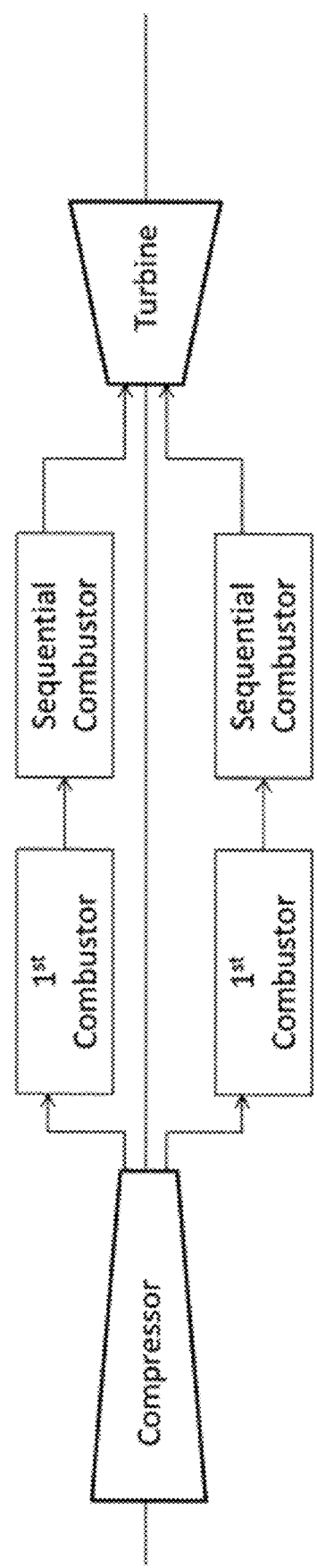
FIGS. 4-6 depict different exemplary functional schemes where a sequential combustor according to the invention may be arranged.
Figure 5:
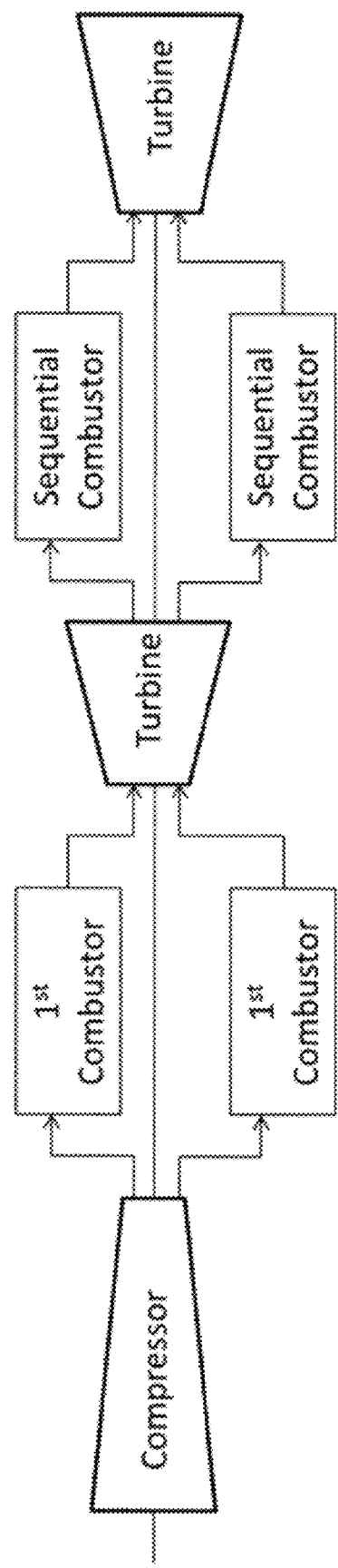
Figure 6:
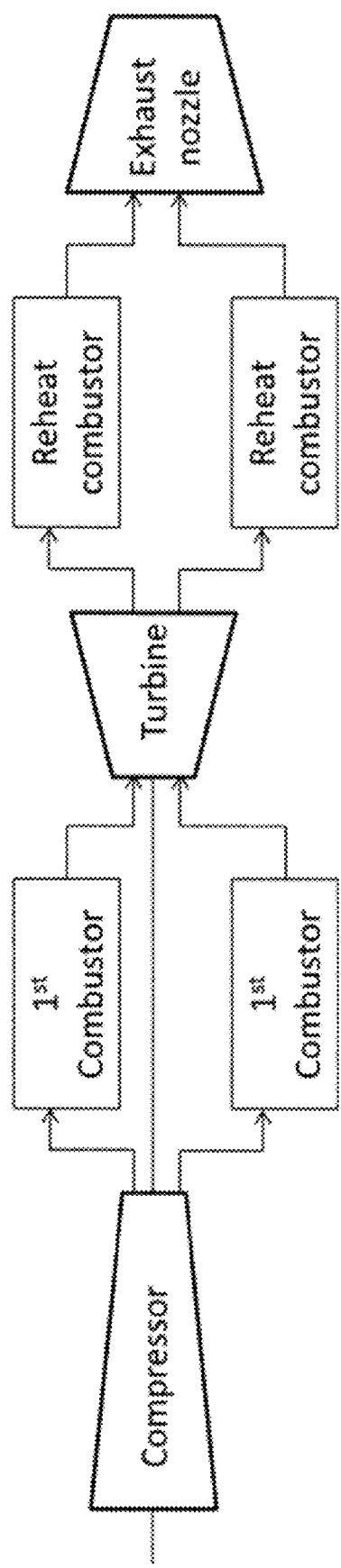

The reduction in static temperature prolongs the auto-ignition delay time (as shown in the above mentioned FIG. 2). In particular, the temperature drop inside the premixing region may be up to 200K, resulting in ten times increase in ignition delay time. However the turndown capability of the combustor depends upon the total temperature in the burner, provided that the Mach number in the combustor is sufficiently reduced. This difference between total and static temperature can then be utilized to extend the turndown characteristics of the combustor, for a given temperature, and therefore auto-ignition delay time, within which the burner operates.

In the premixing section 101, the flow of oxidant and fuel after the converging passage 105 duct 1105 passes through the final diffuser section 108 diverging duct 1108 before expanding into the combustion chamber 102.

Figure 11:
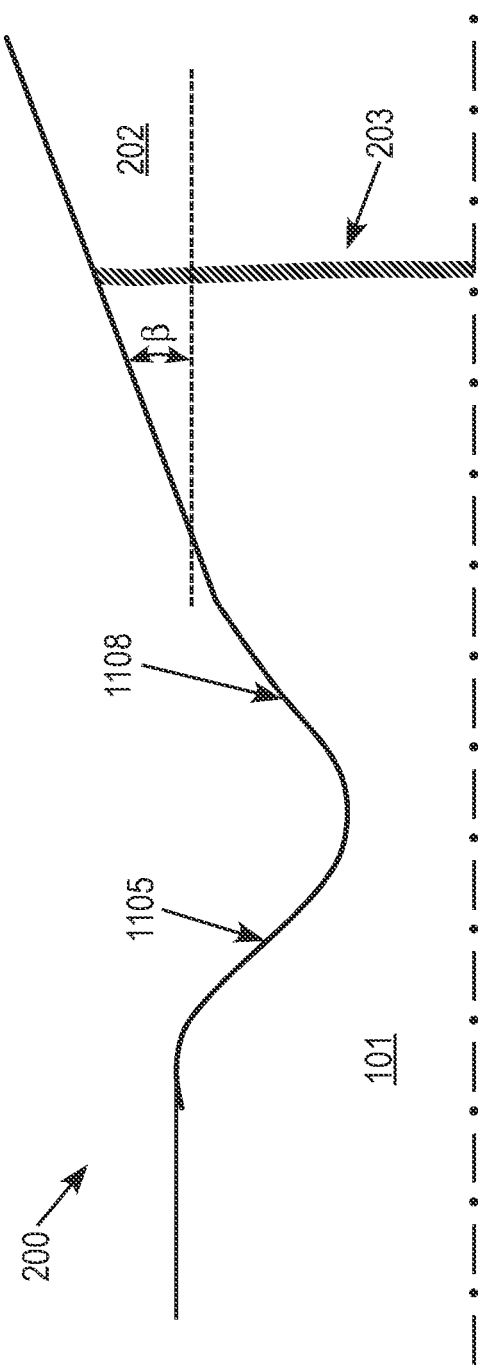
FIGS. 11-13 show respectively a schematic, a top and a perspective view of a sequential combustor according to a second exemplary embodiment of the present invention.

With now reference to next FIG. 11, it is depicted a side section schematic view of a sequential combustor 200 according to a second preferred embodiment of the present invention. In this second embodiment, the premixing section 101 is the same one disclosed with reference to the first embodiment: the flow of oxidant and fuel in the premixing section is accelerated through the converging duct 105, and then experiences the diverging duct 1108 prior to entering into a combustion chamber 202.

Differently, in this case, the combustion chamber 202 comprises a diffuser section 202 formed by a diverging duct. Hence, in this second embodiment the flow of oxidant and fuel, after the premixing section 101 following a first converging portion, continues its path along the diverging duct 1108 and then, seamlessly, into the diffuser section 202, where a flame 203 is produced. A very rapid flow deceleration is required to provide the necessary temperature gradient for the flame stabilization. As a nonlimiting exemplary embodiment, such a rapid flow divergence is advantageously achieved through an expansion of the diffuser section characterized by an expansion angle β which is equal to 9° or greater. Preferably, the expansion angle β is approximately in the order of 15°. Additionally, splitter plates (not shown) may be used to further increase the diffuser angle up to 45°.

Figure 12:
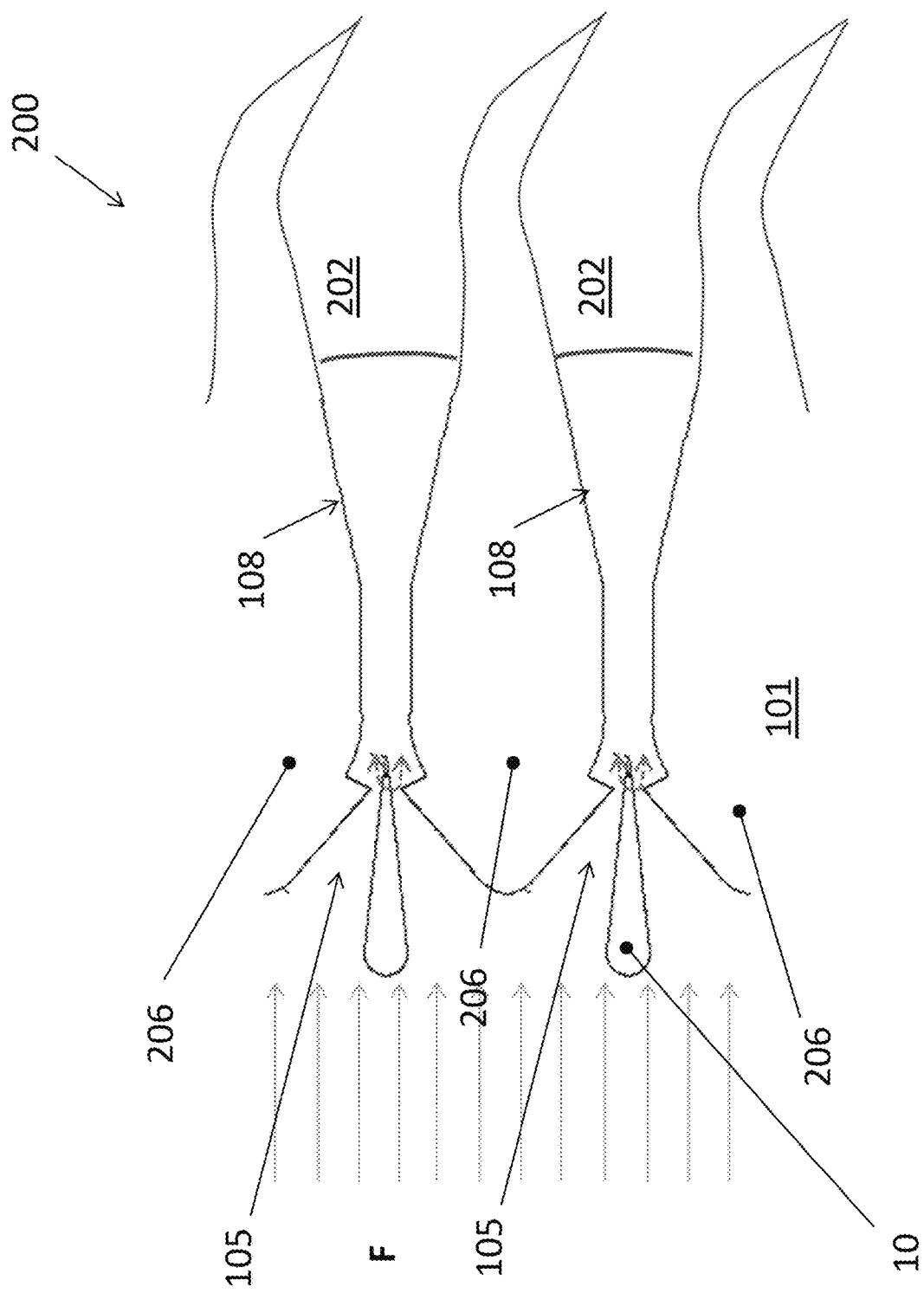
Figure 13:
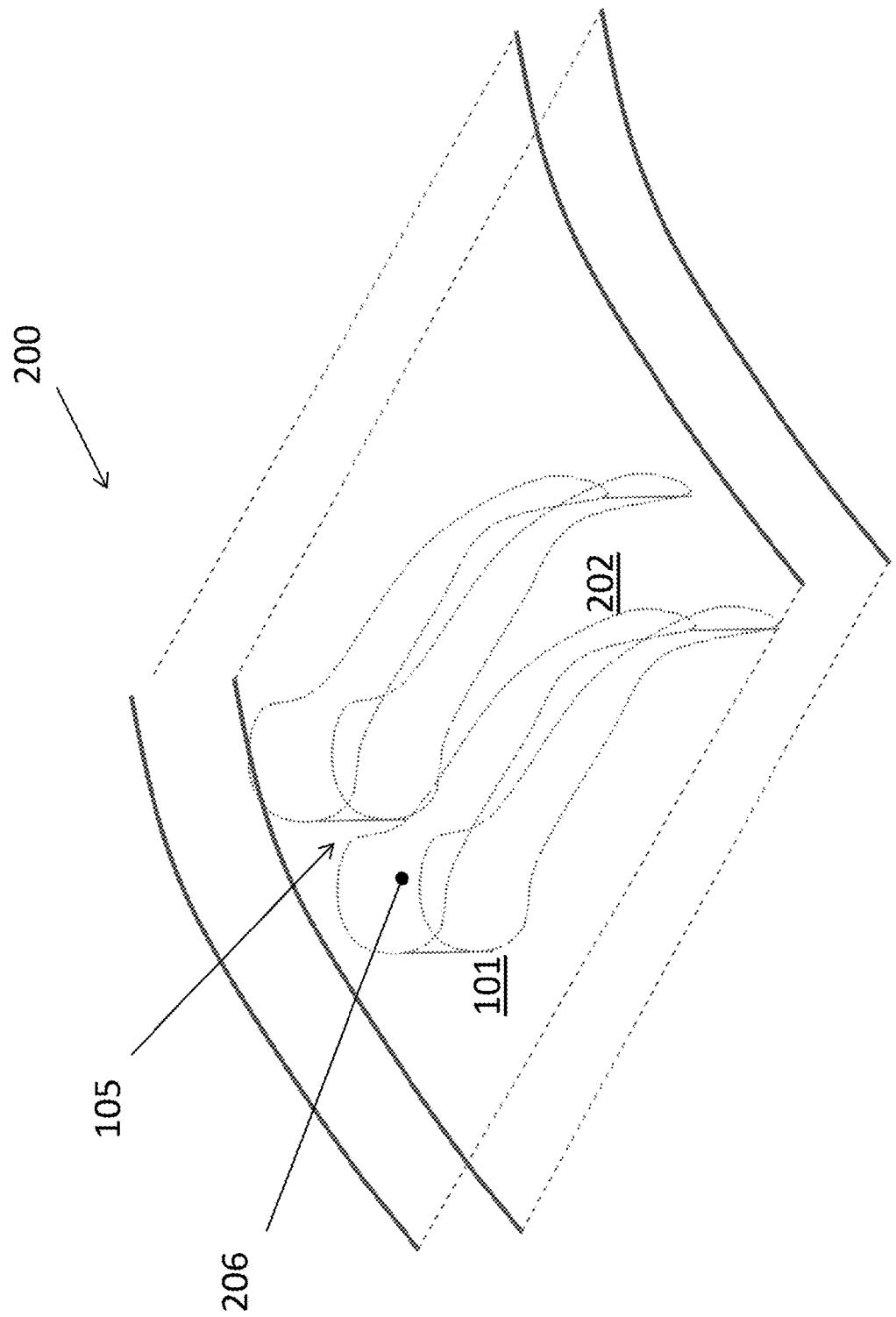

With now reference to the next FIGS. 12 and 13, it is shown the sequential combustor 200 respectively in side section and perspective views, where the flow of oxidant (coming from a first upstream combustor, not shown) is indicated with arrows F. Similarly to the first embodiment, sequential combustor 200 may comprise a plurality of divergent passages formed between a series of vanes 206 arranged in sequence. In this case, the diffuser section 202, where the combustion takes place, is positioned downstream the converging and diverging ducts 1105 and 1108, where the oxidant is accelerated and premixed with the fuel. This way, the flow of oxidant and fuel travels across the sequential combustor 200 experiencing a typical convergent-divergent duct. Vanes 206, and in particular their shape allowing the formation of such convergent-divergent passages, are best seen in perspective view of FIG. 13.

The diffuser section 202, where the combustion takes place, focuses its advantageous effect on the flame stabilization zone. As described above, prior to this zone the flow is accelerated to a Mach number, typically equal or greater than 0.5. The flow of oxidant and fuel is then decelerated which results in an increasing static temperature with downstream distance. The initial acceleration, which occurs in the region where fuel and oxidant mixing is being completed, leads to a reduction in static temperature, which slows the auto-ignition reactions. The subsequent increase in static temperature, in the deceleration (diffuser) section, re-triggers the auto-ignition reactions, which in turn leads to the onset of combustion. In order to limit pressure losses, the Mach number prior to combustion is approximately 0.3.

Within the present invention, recirculation zones are not required. Instead, the location of the flame is stabilized through a positive temperature gradient along the flow path, driven by the reduction in Mach number from its maximum value. Under these circumstances, though the flame location will still move as inlet boundary conditions change, the movement is restricted by virtue of the temperature gradient. Additionally the sequential combustor according to the invention has an operating mode which is self-stabilizing against perturbations. For example, if the inlet boundary conditions are perturbed such that the auto-ignition delay time increases, the flame will tend to move downstream. However that moves the flame into a region of lower Mach number, and thus higher temperature, which rather leads to a reduction of the ignition delay time.

This counteracts the effect of the perturbation. The reverse is also true. If the boundary conditions are perturbed such that the auto-ignition delay time is reduced, the flame tends to move upstream.

This however moves the flame towards a higher Mach number, and a lower temperature and hence it tends to rather increase the auto-ignition delay time and move the flame downstream.

Therefore, the impact of the perturbation is always counteracted.

Given the absence of recirculation zones, the pressure drop coefficient can be reduced and a higher Mach number can be allowed, approx. 0.3 prior to combustion, whilst still limiting the pressure loss to acceptable levels. This allows the cross section of the combustor to be lower.

In the present state-of-the-art combustors, the reliance upon recirculation zones to stabilize/anchor the combustion means that the combustion process is rate-limited by fluid dynamic mixing, as the anchoring/stabilization is enabled by the exchange of mass/heat from the recirculation zones to the main flow. This requires the combustion systems to be sized such that the residence time is of several milliseconds. In the present case, combustion is not limited by mixing processes and can proceed at a rate given by the chemical kinetic reactions. In the case where CO burnout to very low levels is necessary, the required residence time is one order of magnitude lower than the present state-of-the-art. In the case where CO emissions from the gas turbine can be allowed to rise, the required residence time is more than two orders of magnitude lower than the present state-of-the-art.

A smaller cross section of the combustor, allowed by combusting within higher velocity flow without a corresponding increase in length and due to small residence time required for the combustion process, leads to a more compact combustor. This has benefits regarding costs, airflow management and maintenance, and makes it easier to achieve mechanical integrity goals. Further simplification is afforded by the removal of front panels or other bluff structures that are necessary to support recirculation zones, with associated reduction in material (e.g. metal and thermal barrier coating that constitute the front panel) and cooling flows necessary to keep its temperature to acceptable levels.

An additional benefit of the low residence time required in the post-combustion gas is the limitation of the rate of formation of oxides of Nitrogen (NOx), particularly at high temperatures.

This therefore allows firing temperatures of gas turbines to increase, without a corresponding increase in NOx.

Within the present invention, the flame stabilization relies on control of the static temperature variations due to control of the flow velocity (Mach number variations) such that combustion can take place in a dedicated combustor as well as in the turbine vanes: shaping the vanes as herein described can provide the required flow acceleration/deceleration which permits the integration of multiple stages.

Figure 14:
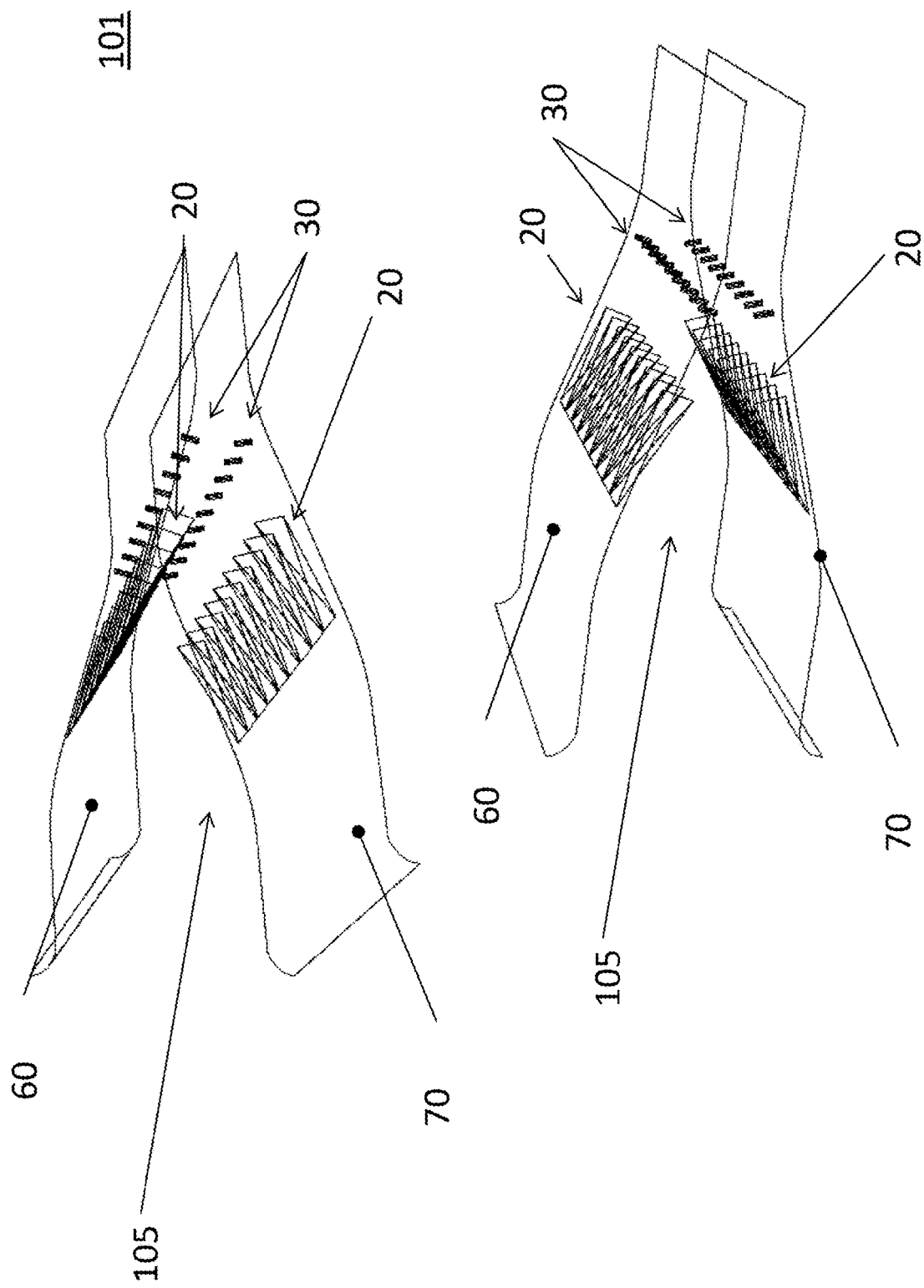
FIGS. 14-19 show different details of the sequential combustor according to the present invention.

With now reference to FIG. 14, two perspective views from different angles of a convergent passage 105 are depicted. The convergent passage 105 is formed between adjacent vanes, where facing sidewalls 60 and 70 are illustrated. Convergent passages 105, and more in general the premixing section of the sequential combustor, are the same for the first and second embodiments, so the following description applies to both.

Along the convergent passage 105, fuel injectors 30 and mixing devices 20 are provided on sidewalls 60 and 70. Mixing devices are preferably in the form of protruding elements which act as turbulence generators in order to promote the mixing of oxidant and fuel. In the example of FIG. 14, fuel injectors 30 are provided on sidewalls 60 and 70 downstream mixing devices 20.

Figure 15:
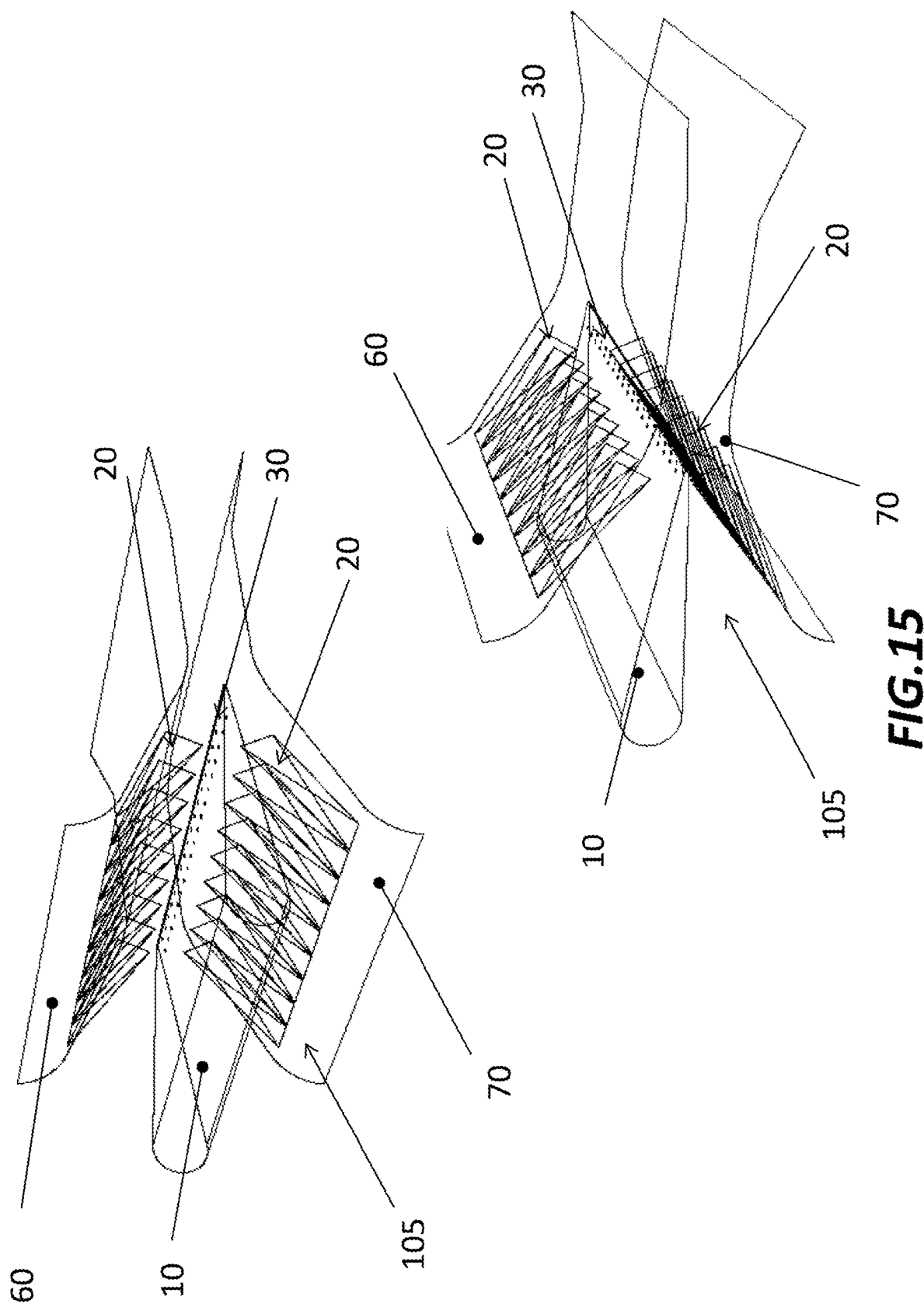

As an alternative, illustrated in the next FIG. 15, the premixing section comprises a central airfoil element positioned along the convergent passage 105 and between adjacent vanes. The airfoil element 10 is shaped such to aerodynamically interact with the incoming flow of oxidant and to provide flow conditioning, and in practise separates convergent passage 105 into two separate top and bottom convergent passages. For this purpose, airfoil element 10 includes a rounded leading edge and a trailing edge, the latter reaching a downstream area in the duct with respect to mixing devices 20. In this case, fuel injectors 30 are provided in the proximity of the trailing edge of the airfoil element 10.

Figure 16:
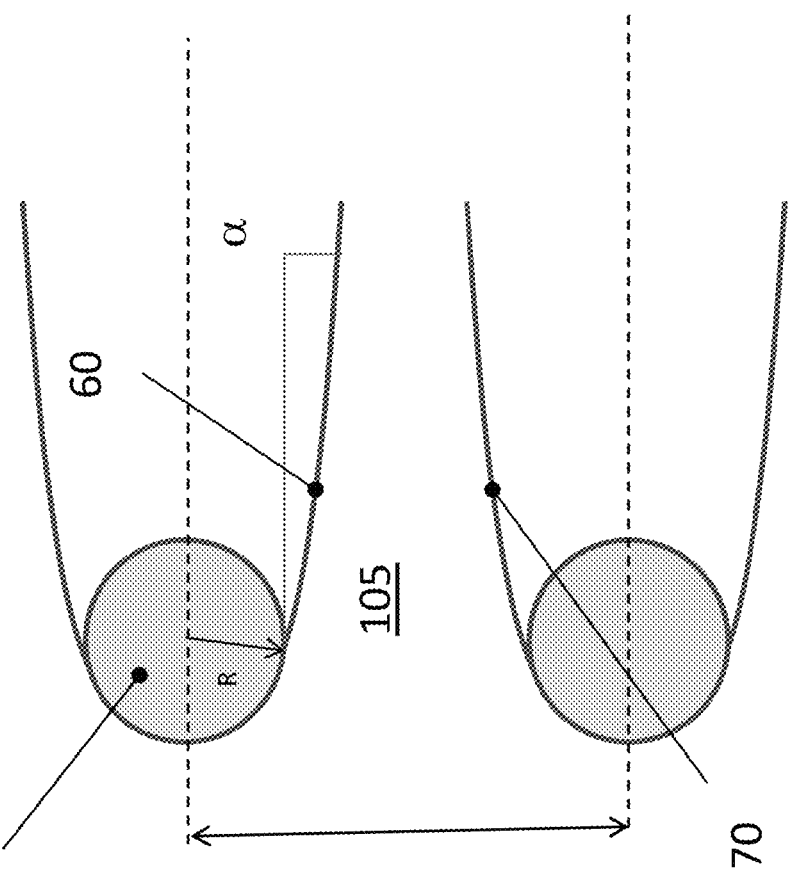

With reference to following FIG. 16, a schematic side section view of a convergent passage 105 shows a preferred geometry.

In particular, each vane has a rounded leading edge 40, wherein a radius of curvature R thereof is preferably equal to a fourth of a distance D measured between axes of two adjacent vanes. Radius R may also be lesser.

The same geometric proportion may be chosen for the rounded leading edge of airfoil element (not shown in the figure). Moreover, facing sidewalls 60, 70 which form the convergent passage 105 present an angle of contraction a, along the duct, which has a maximum value of approximately 30° and a preferred value substantially equal to 20°.

Figure 17:
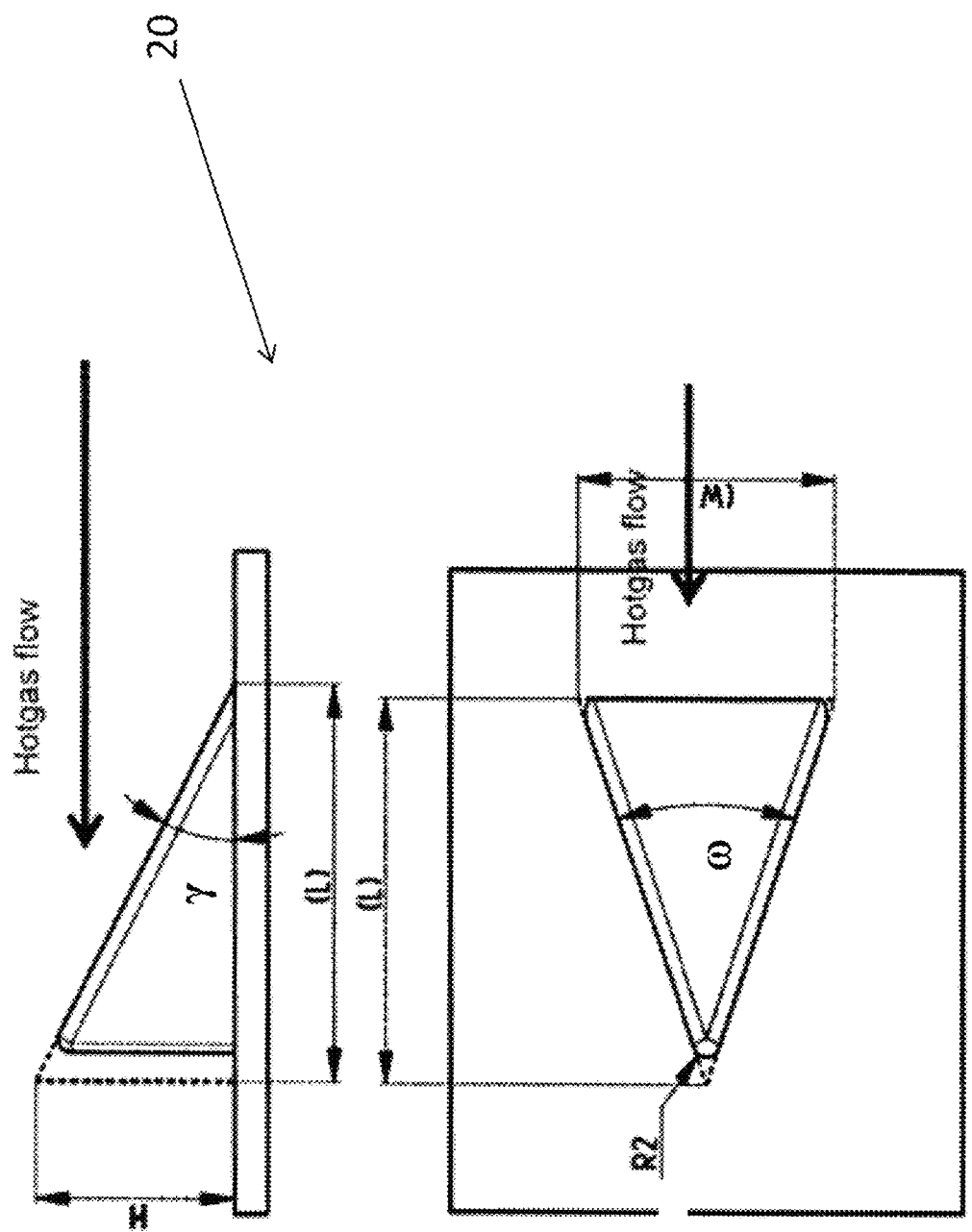

Next FIG. 17 illustrates a preferred geometry of a mixing device 20. Mixing device 20 comprises a delta-wing vortex generator having construction angles γ and ω, respectively in a section view and in a top view of the combustor, equal to 15° or greater, and in any case not exceeding 30°. Additionally, mixing device 20 has a height H, a width W, and a length L. The height H is preferably equal to a fourth of the distance D between two adjacent vanes, and does not exceed a third of said distance. The nozzle of the vortex generator has a radius R2. The number of mixing devices 20 is generally arranged according to the premixing section geometry, preferably without exceeding fifteen devices on each vane sidewall 60, 70.

Figure 18:
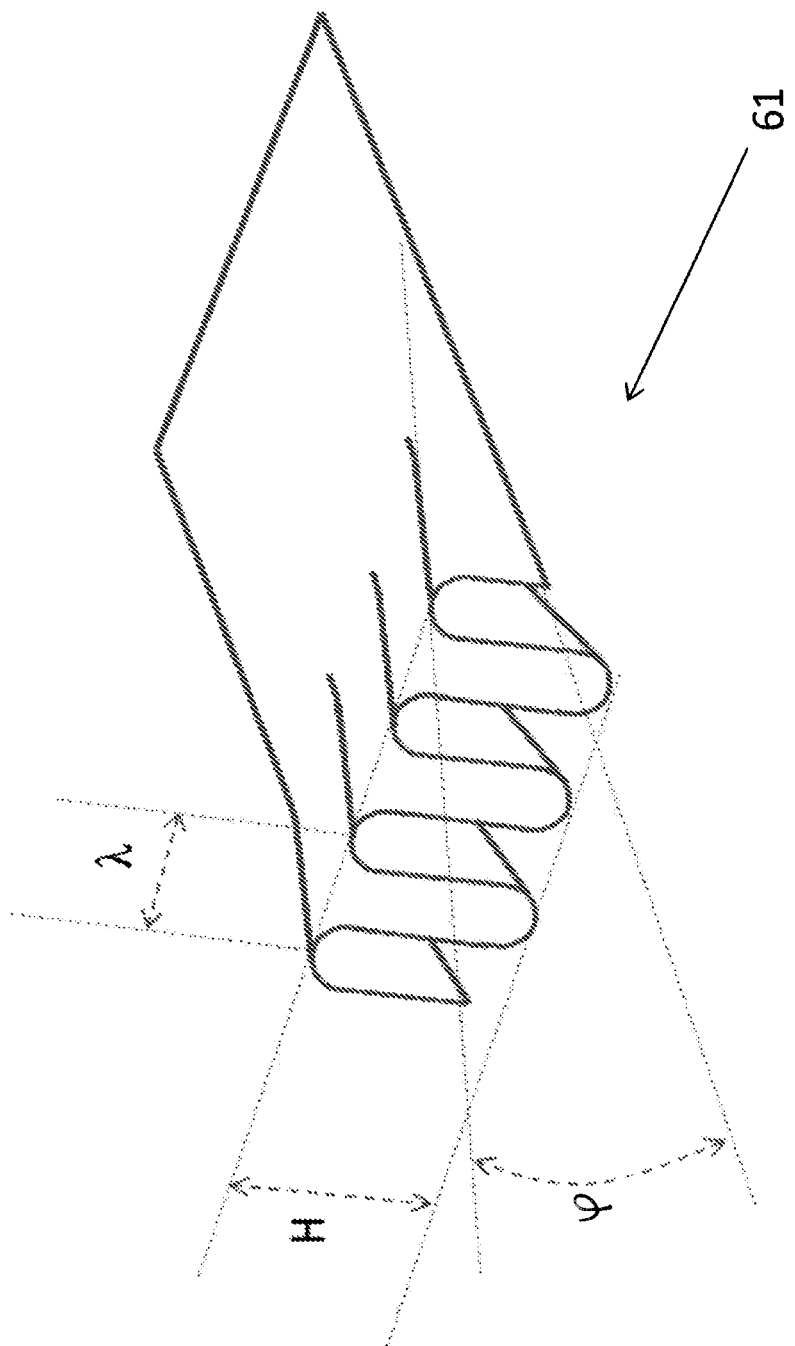
Figure 19:
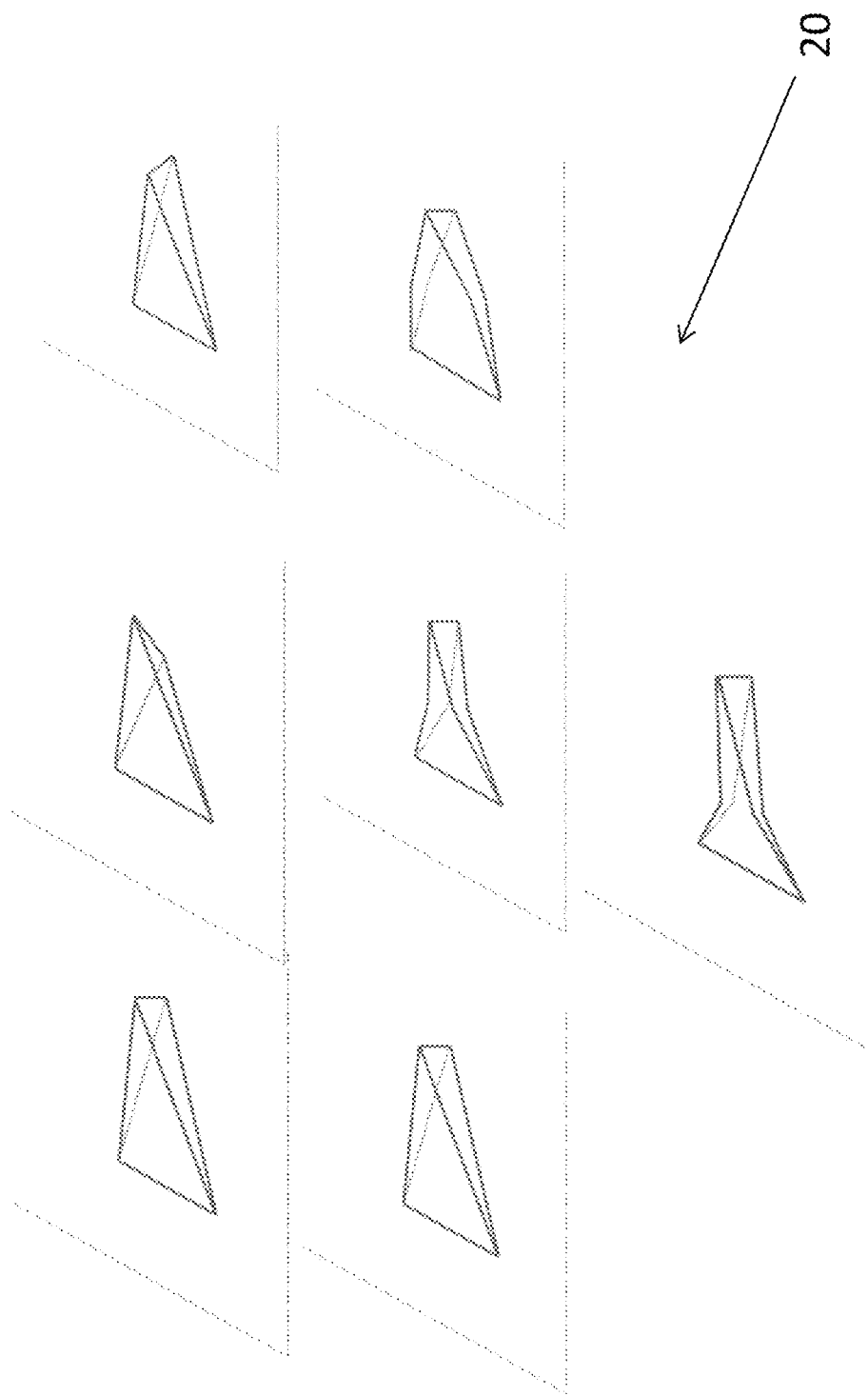

Additional mixing devices may also be distributed onto the airfoil element, as depicted in following FIG. 18. Such additional mixing devices may be delta-wing devices as disclosed above, or in the shape of lobes 61, where a penetration angle φ is preferably comprised within a range 10°-22°, and a ratio between a pitch K and a height H is within a range 0.4-2.5, and preferably close to unity. Mixing devices 20, as presented in FIG. 17, are essentially triangle-shaped. However, mixing devices may also be of irregular shapes, as illustrated, as non-limiting examples, in FIG. 19.

Turbulence enhancement devices may also be implemented on the walls of the divergent passages, where combustion takes place. These devices may take the form of reverse delta wings, turbulators, ribs or flow ejector using higher pressure compressor air.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A sequential annular combustor for a gas turbine, comprising:
    a premixing section having a first diameter, a radially converging duct, and a radially diverging duct in serial flow arrangement;
    a combustion chamber having a second diameter greater than the first diameter arranged downstream of the premixing section, the combustion chamber including a diffuser at an upstream end of the combustion chamber; and
    a plurality of radially extending vanes extending from a point in the radially converging duct of the premixing section to a point in the diffuser of the combustion chamber; and one or more passages formed between adjacent vanes of the plurality of vanes, each passage having a contour including a circumferentially convergent section and a circumferentially divergent section, wherein the circumferentially divergent section of each passage extends downstream from the circumferentially convergent section of each passage and the diffuser having an expansion angle for producing rapid flow deceleration of oxidant and fuel.

2. The sequential annular combustor according to claim 1, wherein each vane of the plurality of vanes comprises:
a rounded leading edge.

3. The sequential annular combustor according to claim 2, wherein each of said rounded leading edges of the plurality of vanes has a radius of curvature which is a fourth or less of a distance D between the respective leading edges of each of two adjacent vanes of the plurality of vanes.

4. The sequential annular combustor according to claim 1, wherein said premixing section comprises:
mixing devices distributed along facing sidewalls of adjacent vanes of the plurality of vanes.

5. The sequential annular combustor according to claim 1, wherein said premixing section comprises:
fuel injectors.

6. The sequential annular combustor according to claim 5, wherein said premixing section comprises:
an airfoil element positioned along said radially convergent duct between adjacent vanes of said plurality of vanes, said airfoil element having a rounded leading edge and a sharp trailing edge, said fuel injectors being provided at said trailing edge.

7. The sequential annular combustor according to claim 1, comprising:
the diffuser of the combustion section extends from the circumferentially divergent sections of the one or more passages into the combustion chamber.

8. A sequential annular combustor for a gas turbine, comprising:
a premixing section having a radially converging duct and a radially diverging duct in serial flow arrangement;
a combustion chamber arranged downstream of the premixing section, the combustion chamber including a diffuser at an upstream end of the combustion chamber;
a plurality of radially extending vanes extending from a point in the radially converging duct of the premixing section to a point in the diffuser of the combustion chamber; and
one or more passages formed between adjacent vanes of the plurality of vanes, each passage having a contour including a circumferentially convergent section and a circumferentially divergent section,
wherein the circumferentially divergent section of each passage extends downstream from the circumferentially convergent section of each passage and the diffuser having an expansion angle for producing rapid flow deceleration of oxidant and fuel.

9. The sequential annular combustor according to claim 8, wherein each circumferentially divergent section of each passage is arranged downstream of a respective circumferentially convergent section of each passage, said respective circumferentially convergent and divergent sections formed by a matching contour of respective adjacent vanes of the plurality of vanes forming the passage.

10. The sequential annular combustor according to claim 8, wherein said premixing section comprises:
plural circumferentially divergent sections, wherein each circumferentially divergent section is arranged downstream of an adjacent circumferentially convergent section.

11. Method for operating a sequential annular combustor for a gas turbine, the sequential annular combustor having:
a premixing section having a first diameter a radially converging duct and a radially diverging duct in serial flow arrangement;
a combustion chamber having a second diameter greater than the first diameter arranged downstream of the premixing section, the combustion chamber including a diffuser at an upstream end of the combustion chamber; and
a plurality of radially extending vanes extending from a point in the radially converging duct of the premixing section to a point in the diffuser of the combustion chamber; and
one or more passages formed between adjacent vanes of the plurality of vanes, each passage having a contour including a circumferentially convergent section and a circumferentially divergent section,
wherein the circumferentially divergent section of each passage extends downstream from the circumferentially convergent section of each passage and the diffuser having an expansion angle for producing rapid flow deceleration of oxidant and fuel;
said premixing section being configured to receive and premix a flow of oxidant and fuel wherein the method comprises:
admitting the flow of oxidant and fuel within one or more of said convergent sections for acceleration to a velocity correspondent to a Mach number substantially equal to 0.5 or greater.

12. Method for operating a sequential combustor for a gas turbine according to claim 11, wherein the method comprises:
decelerating the flow of oxidant and fuel along one or more of said divergent sections to a velocity correspondent to a Mach number in the region of 0.3 prior to combustion.

* * * * *